United States Patent [19]

Johansson et al.

[11] 4,397,992
[45] Aug. 9, 1983

[54] PREDISPERSED LIQUID OR LOW MELTING SOLID PEROXIDE VULCANIZING AGENT OR COAGENT COMPOSITIONS

[75] Inventors: Anders H. Johansson; Thomas J. Leo, both of Yardley, Pa.

[73] Assignee: Wyrough and Loser, Inc., Trenton, N.J.

[21] Appl. No.: 370,499

[22] Filed: Apr. 21, 1982

[51] Int. Cl.³ .............. C08L 51/04; C08L 55/02; C08J 3/20; C08J 3/24
[52] U.S. Cl. .................. 525/305; 525/304; 525/308; 525/309; 525/310; 525/315; 525/316; 524/534; 524/533; 523/206; 523/211; 523/351
[58] Field of Search .............. 523/206, 211, 351; 525/345, 310, 305, 315, 316

[56] References Cited

U.S. PATENT DOCUMENTS

| 2,888,424 | 5/1959 | Precopio et al. |
|---|---|---|
| 2,928,801 | 3/1960 | Safford et al. |
| 2,985,632 | 5/1961 | Willis .................. 525/345 |
| 3,396,152 | 8/1968 | Henning .................. 260/79.5 |
| 3,655,825 | 4/1972 | Souder et al. |
| 3,867,481 | 2/1975 | Whang |
| 3,880,791 | 4/1975 | Marcozzi |
| 3,894,979 | 7/1975 | Sampgles |
| 3,945,966 | 3/1976 | Vicic et al. |
| 3,985,704 | 10/1976 | Jones et al. |
| 4,006,283 | 2/1977 | MacKenzie, Jr. et al. |
| 4,015,058 | 3/1977 | Schober |
| 4,025,706 | 5/1977 | Schober |
| 4,048,036 | 9/1977 | Prucnal |
| 4,092,285 | 5/1978 | Leo et al. .................. 260/28.5 |
| 4,110,240 | 8/1978 | Leo et al. .................. 252/182 |
| 4,202,790 | 5/1980 | Steller |
| 4,239,644 | 12/1980 | Nambu et al. |
| 4,243,773 | 1/1981 | Arnaud et al. |
| 4,268,637 | 5/1981 | Weldy |

OTHER PUBLICATIONS

Bulletin ORC-101C, pp. 1-9, Hercules Incorporated.
Acryloid® KM-611, Rohm and Haas Company.
Acryloid® KM-323B, Rohm and Haas Company.

Primary Examiner—Carman J. Seccuro
Attorney, Agent, or Firm—Robbins & Laramie

[57] ABSTRACT

A non-bleeding, predispersed composition useful for dispersing a peroxide vulcanizing agent or coagent into a rubber or plastic stock is disclosed which comprises (A) from about 20 to about 70 percent by weight of a peroxide vulcanizing agent or coagent, and (B) a multi-stage graft copolymer comprising (1) from about 70 to about 90 percent by weight of a hard portion made by graft polymerizing (a) a monomer or monomers selected from the group consisting of lower alkyl methacrylates, styrene, and mixtures thereof, and (b) a small but effective amount of a cross-linking agent for said monomer or monomers, in any order onto (2) from about 10 to about 30 percent by weight of a rubbery portion comprising a polymer or copolymer made by polymerizing (a) a monomer selected from the group consisting of butadiene and lower alkyl acrylates or (b) a mixture of monomers selected from the group consisting of styrene and butadiene, and acrylonitrile and butadiene.

35 Claims, No Drawings

4,397,992

PREDISPERSED LIQUID OR LOW MELTING SOLID PEROXIDE VULCANIZING AGENT OR COAGENT COMPOSITIONS

BACKGROUND OF THE INVENTION

1. Field of the Invention

This invention relates to non-bleeding, predispersed liquid or low melting solid peroxide vulcanizing agent or coagent compositions and to processes for their preparation.

2. Description of the Prior Art

During the manufacture of rubber or plastic articles, numerous rubber or plastic compounding chemicals, such as peroxide vulcanizing agents and coagents, accelerators, activators, vulcanizing agents, antidegradents, stabilizers, and the like, must be added to the rubber or plastic stock. These compounding chemicals are generally in the form of finely divided dry powders, liquids and low melting solids. They are conventionally incorporated into the stock using internal mixers, such as Banbury mixers, rubber mills or extruders. In the use of such masticating equipment, the chemicals are blended directly with the rubber or plastic stock or masterbatches of these chemicals are added during mixing.

Most of these compounding chemicals are in the form of finely divided dry powders which can become a health hazard to all persons who must work with them from the dry grinding operation to the compounding stage. During all of the mechanical manipulations of these powdered chemicals, such as packaging, transportation, unpacking, weighing and adding to the mixing vessel, the issuing dust clouds represent wasted chemical which leads to inaccurate addition adversely affecting the reproducibility of the cure rate and physical properties of the product from batch to batch. Most of these compounding chemicals are highly reactive, undergo hydrolysis and oxidation reactions, and some are undesirably deliquescent. In addition to the chemical lost as a dust cloud or vapor during mixing, some may fall through the rolls during mill mixing.

These problems associated with handling, mixing and adequately dispersing powdered chemicals into tough polymer matrices have plagued the rubber and plastic industries since their inception. Two particularly suitable techniques for preparing predispersions containing very high concentrations of such compounding chemicals to eliminate these problems are disclosed in U.S. Pat. Nos. 4,092,285 and 4,110,240.

An equally troublesome problem to these industries has been the handling, mixing and dispersing of liquid and low melting solid compounding chemicals. A low melting solid compounding chemical is one that melts at or below handling or processing temperatures, generally considered in the rubber or plastics industries to be below about 140° F. (60° C.). Many such compounding chemicals are employed as peroxide vulcanizing agents and coagents, and polymerization catalysts for rubber and plastic compounds. They are all highly reactive and many are strong oxidizing agents. During processing, when compounding chemicals that are liquids or that melt at or below mill temperatures, such as organic peroxides, are added to stock on the mill, the band of stock on the roll breaks and the mixture falls off of the roll into the pan. The stock is then in the form of a slippery mass that is difficult to band again on the mill. When these liquid or low melting solid compounding chemicals are added to internal mixers, they have a tendency to lubricate the stock causing slippage and a reduction in shear which leads to longer mixing times. They also are sprayed around the inside of the mixer and cake up on the surfaces of the equipment.

Compounding chemicals in liquid or molten form, particularly those which are very viscous, are difficult to transfer from one container to another with any degree of accuracy because of incomplete transfer. Viscous liquids containing more than one ingredient also have a tendency to striate, which leads to concentration gradients upon sitting and to inaccurate additions of the active material. In addition, residual chemicals on packages and weighing containers tend to pick up contaminants, adhere to the handler's body and clothing, and in general, produce unpleasant and often hazardous working conditions.

One such low melting solid organic peroxide which has been found to be particularly difficult to handle is dicumyl peroxide. Dicumyl peroxide is used primarily as a curing agent or vulcanizing agent for many rubber or plastic polymers, such as polyethylene, ethylene-propylene copolymers (EPM), ethylene-propylene-diene terpolymers (EPDM), nitrile rubbers, polybutadiene rubbers, styrene-butadiene copolymer (SBR), chlorinated polyethylenes, chlorosulfonated polyethylenes, natural rubber, polyisoprene rubber, neoprene rubber, silicone rubber, acrylic rubber, polysulfide rubber, polyurethane, acrylonitrile-butadiene-styrene, and polyester. Most elastomeric polymers can be cross-linked with dicumyl peroxide with the exception of butyl rubber, polyisobutylene, epichlorohydrin rubber, polypropylene, polypropylene oxide rubber, and polyvinyl chloride in which chain scission occurs in the presence of a peroxide. Halogenated polymers must be fully stabilized from dehalogenation decomposition products before they can be cross-linked with dicumyl peroxide.

Dicumyl peroxide is a low melting solid which is available in two grades, a technical grade which is 90–96 percent pure and has a melting point of about 85° F. and a recrystallized grade which is 96–100 percent pure dicumyl peroxide and has a melting point of 100.6° F. Because it has such a low melting point, dicumyl peroxide in the form of granules melts readily in containers during the warm conditions often encountered in shipment and storage. In fact, the pressure encountered in a standard drum container is enough to quickly fuse the granules together. When the melted peroxide cools, it hardens into a block in the shape of the container. If the compounder wishes to use some of the peroxide, he must then break chunks of the peroxide from the block. The peroxide may also be melted and handled as a liquid. This is hazardous because the temperature must be carefully controlled to avoid decomposition or possible exothermic reaction. Moreover, the melted peroxide tends to splash and to refreeze easily and stick to the container. This often leads to inaccurate additions of the peroxide to the stock from batch to batch, resulting in poor reproducibility of the cure rate and the physical properties of the vulcanizates.

In order to obtain useful cured products when employing dicumyl peroxide, it is important that a uniform controlled amount of the peroxide be dispersed in the compound and that the compound be exposed to a uniform amount of processing heat history. When rubber is processed, it generates heat from the friction of the large macromolecules of rubber rubbing against one another. Normal temperatures encountered during mixing of rubber range from about 150° F. to 400° F. When dicumyl peroxide is added to the rubber compound being mixed, the warm rubber quickly melts the dicumyl peroxide. The melted peroxide lubricates and breaks up the batch of rubber compound, splashes out of the mixing unit, and becomes stuck to the cold metal parts of the mixing unit.

Similar problems are encountered in the handling and processing of another low melting solid organic peroxide, viz. α,α'-bis(t-butylperoxy)diisopropylbenzene. This peroxide, which is listed as having a melting point in the range of 122°–176° F., although melting points in the range of 113°–131° F. are typical, is likewise employed primarily as a vulcanizing agent or curing agent for the same rubber or plastic polymers that can be cured by dicumyl peroxide.

A number of attempts have been made to prepare products intended to eliminate the problems associated with the handling and processing of low melting solid peroxide compounding chemicals, such as dicumyl peroxide and α,α'-bis(t-butylperoxy)diisopropylbenzene. For example, dicumyl peroxide has been let down on a diluent such as Burgess KE clay and calcium carbonate at a concentration of about 40 percent active chemical. These products are commercially available as Di-Cup® 40KE and Di-Cup® 40C from Hercules, Inc. and Peroximon DC 40 from Montedison, S.p.A. α,α'-bis(t-butylperoxy)diisopropylbenzene is commercially available at a 40 percent active concentration let down on Burgess KE clay. Examples of such products include Vul-Cup® 40KE from Hercules, Inc., Peroximon F 40 from Montedison, S.p.A., Percadox 14/40 from Noury Chemical Co., and Trigonox 14/40 from Akzo Chemie Nederland.

Although these products behave as solids at temperatures above the melting point of the dicumyl peroxide and the α,α'-bis(t-butylperoxy)diisopropylbenzene, they suffer from a number of serious drawbacks. First, the activity of the product is relatively low so that a large amount of filler material is added to the stock. This filler material not only adds unwanted ingredients to the final product made from the stock but also increases the cost of compounding the stock since more of these products must be used to obtain the same amount of desired peroxide. If the polymer is generally transparent, such as polyethylene, the large amount of added filler material renders the final product hazy or translucent to opaque. Second, since the filler material is a rigid inorganic substance rather than an elastomeric or polymeric substance, it tends to detract from the desired physical properties of the final product. Third, these products tend to striate. During repeated melting and freezing of the peroxide during shipping and storage, the peroxide tends to separate from the filler which settles gradually toward the bottom of the container resulting in a greater concentration of peroxide at the top of the container. This difference in concentration of peroxide makes it difficult to obtain the same amount of peroxide from batch to batch. The portion with the higher concentration of filler tends to be powdery, and therefore, is sprayed around the internal mixer during the mixing operation. Fourth, since the peroxide is on the surface of the inorganic material, the product will bleed during shipping where temperatures above the peroxide melting point are encountered. When the temperature goes below the melting point, the particles tends to agglomerate.

Some of these drawbacks were overcome by mechanically dispersing the dicumyl peroxide in ethylene-propylene copolymer (EPM) and ethylene-propylene-diene terpolymer (EPDM). Such products are available commercially as POLY-DISPERSION® E(DIC)D-30, E(DIC)D-40, and T(DIC)D-40 from Wyrough and Loser, Inc. The concentration of dicumyl peroxide in the predispersion has been limited to no more than about 40 percent by weight, however, because of the basic incompatibility between the dicumyl peroxide and the polymer. This incompatibility is manifested by a "bleeding" of the dicumyl peroxide to the surface which imparts a greasy feel at temperatures above 100° F. and a white crystal growth at temperatures under 100° F. Care must be taken to avoid losing this "grease" or "cyrstal" since it is active dicumyl peroxide. Moreover, these polymeric dispersions of dicumyl peroxide still suffer from the disadvantage of having a relatively low peroxide activity.

Therefore, for these reasons, none of the prior art methods for improving the handling and processing characteristics of liquid or low melting solid peroxide vulcanizing agents and coagents has been completely satisfactory.

SUMMARY OF THE INVENTION

The drawbacks and shortcomings of the prior art products have been alleviated by the present invention. In accordance with the present invention, liquid or low melting solid peroxide vulcanizing agents or coagents are homogeneously incorporated into a polymeric binder composition comprising a major amount of a multi-stage graft copolymer, and optionally, minor amounts of a finely divided reinforcing agent or filler material, a high molecular weight hydrocarbon polymer and a free radical polymerization inhibitor.

The multi-stage graft copolymers which can be employed to prepare predispersed compositions containing peroxide vulcanizing agents or coagents comprise a major amount of a hard portion made by graft polymerizing a monomer or monomers selected from the group consisting of lower alkyl methacrylates, styrene, and mixtures thereof, and a small but effective amount of a cross-linking agent for the monomer or monomers, in any order onto a minor amount of a rubbery portion comprising a polymer or copolymer made by polymerizing a monomer selected from the group consisting of butadiene and lower alkyl acrylates or a mixture of monomers selected from the group consisting of styrene and butadiene, and acrylonitrile and butadiene, preferably with a small but effective amount of a cross-linking agent for the monomer or monomers.

The predispersed peroxide vulcanizing agent and coagent compositions of the present invention are homogeneous, non-bleeding solids at temperatures well in excess of the melting points of the peroxide vulcanizing agents and coagents. These predispersed compositions can be used to rapidly, uniformly and thoroughly disperse the peroxide vulcanizing agents or coagents into a rubber or plastic stock by mechanically mixing the predispersed composition with the stock.

The predispersed compositions of the present invention can be prepared by first mixing the multi-stage graft copolymer powder with any reinforcing agent or filler material employed as a processing aid. If the peroxide vulcanizing agent or coagent is a liquid, it can be blended directly with the mixture of graft copolymer powder and reinforcing agent or filler material. If the peroxide vulcanizing agent or coagent is a low melting solid, however, it can either first be melted before addition to the copolymer powder mixture or it can be dry blended with the copolymer and then melted. If any free radical polymerization inhibitor is to be employed, preferably, it can be dissolved in the molten or liquid peroxide vulcanizing agent or coagent or added to the mixture at any time. The mixture of graft copolymer, reinforcing or filler material and liquid or molten peroxide vulcanizing agent or coagent can then be placed on a preheated mill where it can be banded, milled, and sheeted off. If a high molecular weight hydrocarbon polymer is employed as a processing aid, it can be banded on the mill first and then the mixture of graft copolymer, reinforcing agent or filler material, and liquid or molten peroxide vulcanizing agent or coagent can be mixed into it. The sheets of product can then be diced or otherwise pelletized to facilitate weighing and handling.

DESCRIPTION OF THE PREFERRED EMBODIMENTS

Liquid or low melting solid peroxide vulcanizing agents or coagents are predispersed in a polymeric composition in accordance with the present invention so that they can be uniformly, rapidly and thoroughly dispersed into a rubber or plastic stock.

The peroxide vulcanizing agents which are suitable for use in the present invention include the low melting solids, dicumyl peroxide (m.p. 100.6° F.), and $\alpha,\alpha'$-bis(t-butylperoxy)diisopropylbenzene (m.p. 122°–176° F.), and the liquids t-butyl cumyl peroxide, 2,5-dimethyl-2,5-bis(t-butylperoxy)hexyne-3, 2,5bis(t-butylperoxy)-2,5-dimethylhexane, and the like. Either the recrystallized grade or the technical grade of the dicumyl peroxide can be used in the practice of the present invention. The solid peroxides melt at or below the handling and processing temperatures encountered in the rubber and plastics industries. The handling temperatures include, for example, storage and shipping temperatures which can often reach 140° F.

Peroxide vlucanizing coagents are monomers that enhance cross-linking when used in a peroxide cure system. Coagents are used with peroxide vulcanizing agents in order to increase the efficiency of vulcanization by providing more cross-links and a tighter cure. The peroxide vulcanizing coagents which are suitable for use in the present invention include the liquids, triallyl isocyanurate, triallyl cyanurate, triallyl trimellitate, trimethylolpropane triacrylate, trimethylolpropane trimethacrylate, and the like.

The multi-stage graft copolymers in which the peroxide vulcanizing agent or coagent can be predispersed must exhibit certain desirable properties. The copolymer molecules must be compatible with the peroxide vulcanizing agent or coagent molecules. If they are not compatible, then the peroxide vulcanizing agent or coagent will "bleed" from the composition. The copolymer must also exhibit sufficient structure, i.e. it must have a sufficient amount of interstitial space to hold a reasonable amount of the liquid or molten peroxide vulcanizing agent or coagent, and it must be sufficiently rigid or cross-linked so that the composition will maintain its shape while being highly plasticized, but not so rigid that it will not disperse readily into the rubber or plastic stock. The multi-stage graft copolymers which have been found to exhibit all of these desirable properties, and therefore, are particularly suitable for preparing predispersed peroxide vulcanizing agent or coagent compositions in accordance with the present invention comprise from about 70 to about 90 percent by weight of a hard portion graft polymerized onto from about 10 to about 30 percent by weight of a rubbery portion. The hard portion is made by graft polymerizing a monomer or monomers selected from the group consisting of lower alkyl methacrylates, styrene, and mixtures thereof, together with a small but effective amount of a cross-linking agent for the monomer or monomers. The lowr alkyl methacrylates include, for example, methyl methacrylate, ethyl methacrylate, n-propyl methacrylate, isopropyl methacrylate, n-butyl methacrylate, and isobutyl methacrylate. Suitable cross-linking agents include the dimethacrylic, trimethacrylic, diacrylic and triacrylic esters of polyhydric alcohols, divinylbenzene, divinyl esters of di- or tribasic acids, diallyl esters of polyfunctional acids and divinyl ethers of polyhydric alcohols, such as 1,3-butylene dimethacrylate, divinyl adipate, diallyl phthalate, divinyl ether of ethylene glycol, ethylene glycol dimethacrylate, propylene glycol dimethacrylate, 1,3butylene glycol dimethacrylate, and 1,4-butylene dimethacrylate. Only a minor amount of the cross-linking agent is required to provide sufficient structure to the resulting copolymer so that the peroxide vulcanizing agent or coagent can be held without bleeding. Generally, from about 0.1 to about 5 percent by weight of the monomer is all that will be needed.

The monomer or monomers and the cross-linking agent can be graft polymerized in any order onto the rubbery portion of the graft copolymer. The rubbery portion comprises a polymer or copolymer made by polymerizing a monomer selected from the group consisting of butadiene and lower alkyl acrylates or a mixture of monomers selected from the group consisting of styrene and butadiene, and acrylonitrile and butadiene. The lower alkyl acrylates include, for example, methyl acrylate, ethyl acrylate, n-propyl acrylate, isopropyl acrylate, n-butyl acrylate and isobutyl acrylate. The monomer or monomers are preferably cross-linked with a small but effective amount of a cross-linking agent for the monomer or monomers. Suitable cross-linking agents include all of those listed above for the monomer in the hard portion. When a cross-linking agent is used in the rubbery portion it can be the same as or different from the cross-linking agent used in the hard portion. As in the hard portion, only a minor amount of cross-linking agent, such as from about 0.1 to about 5 percent by weight of the monomer, is needed to provide the copolymer with sufficient structure.

Two multi-stage graft copolymers that have been found to be particularly suitable for use in the present invention are Acryloid ® KM-323B and Acryloid ® KM-611, available commercially from Rohm and Haas Company. Acryloid KM-323B is a multi-stage graft copolymer comprising about 80 percent by weight of cross-linked methyl methacrylate graft polymerized onto about 20 percent by weight of polymerized n-butyl acrylate. Acryloid KM-323B is used as an impact modifier in rigid PVC applications. Acryloid KM-611 is a multi-stage cross-linked graft copolymer comprising about 53 percent by weight of styrene, about 35 percent by weight of methyl methacrylate and about 12 pecent by weight of butadiene. Acryloid KM-611 is also used as an impact modifier in rigid and semirigid PVC applications.

The multi-stage graft copolymers which are suitable for use in the present invention can be made by any of the well-known emulsion polymerization techniques. U.S. Pat. Nos. 3,655,825, 3,867,481 and 3,985,704 and "Emulsion Polymerization of Acrylic Monomers" CM-104 A/cf (supercedes CM-104 J/cg) published by Rohm and Hass Co. disclose suitable techniques for making the copolymers employed in the present invention. These patents and this publication are incorporated by reference as though set forth in full herein.

The predispersed compositions of the present invention optionally contain a minor amount of a finely divided reinforcing agent or filler material. This finely divided particulate material is employed primarily as a processing aid, rather than as a reinforcing agent or as a filler. The particle size of the reinforcing agent or filler is preferably in the range of about 50 nm. to about 10μ. Any of the well-known inorganic reinforcing agents or fillers can be employed, such as clay, talc, carbon black, silica, and calcium carbonate, or organic reinforcing agents or fillers, such as pulverized polyethylene or ethylene vinyl acetate. If the rubber or plastic products which are to be cured using the predispersed peroxide vulcanizing agents or coagents of the present invention are to be transparent, then the reinforcing agent or filler should have an index of refraction similar to that of the rubber or plastic stock. Examples of such reinforcing agents or fillers include silica, polyethylene and ethylene vinyl acetate. Materials such as clay and carbon black are opaque, and therefore, would reduce the light transmitted through the product, rendering the product cloudy or hazy. The predispersed compositions of the present invention optionally comprise up to about 12 percent by weight of the reinforcing agent or filler material. Since they will be added when the composition is too soft to process, only an amount that provides the composition with sufficient body to be processed needs to be employed.

In addition to the reinforcing agent or filler material, the predispersed compositions can optionally contain a minor amount of a high molecular weight hydrocarbon polymer as a processing aid. The hydrocarbon polymers may be added to aid processibility by making the predispersed composition firmer and easier to handle on the mill. For this reason, they are often added when the peroxide vulcanizing agent or coagent is a liquid at room temperature, although they can be used in a predispersion of α,α'-bis(t-butylperoxy)-diisopropylbenzene as well. Suitable high molecular weight hydrocarbon polymers include ethylene-propylene-diene terpolymers (EPDM), polyisobutylene, ethylene-propylene copolymers (EPM), and ethylene vinyl acetate (EVA). The high molecular weight hydrocarbon polymers are preferably saturated, although they can be unsaturated, such as polybutadiene, SBR, and natural rubber. They can also be halogenated, such as chlorinated polyethylene and chlorosulfonated polyethylene. The predispersed compositions of the present invention can optionally comprise up to about 15 percent by weight of the high molecular weight hydrocarbon polymer. Only a sufficient amount to facilitate processing need be added to the predispersed composition.

As will be apparent to those skilled in the art, plasticizers and other processing aids can also be added to the predispersed compositions where desirable.

One of the surprising aspects of the present invention is the fact that when the liquid or molten peroxide vulcanizing agent or coagent is mixed with the multi-stage graft copolymer, relatively large amounts of the peroxide vulcanizing agent or coagent are absorbed by the copolymer particles and do not bleed or bloom out of the predispersed compositions. Moreover, the predispersed compositions remain thermally stable at temperatures up to about 120° F. (50° C.). It has been found that the peroxide vulcanizing agent or coagent can comprise up to about 70 percent by weight of the predispersed composition. Since the multi-stage graft copolymers can be processed on a mill without any additives, it will be appreciated that any lesser amount, for example as little as 1 percent, of the peroxide vulcanizing agent or coagent could be employed. For economic reasons, however, the greatest activity of predispersed peroxide vulcanizing agent or coagent is generally desirable. For these reasons, the predispersed compositions of the present invention will contain at least about 20 percent by weight of peroxide vulcanizing agent or coagent. As more peroxide vulcanizing agent or coagent is added, the multi-stage graft copolymers become more processible up to about 25-30 percent by weight of peroxide vulcanizing agent or coagent. As the amount of peroxide vulcanizing agent or coagent is increased to between 40-50 percent by weight, the compositions become easier to process and slightly tacky requiring the addition of a minor amount of reinforcing agent or filler, and as the amount is further increased to 60-70 percent, more reinforcing agent or filler and/or some high molecular weight hydrocarbon polymer must be added to aid processibility on the mill. Preferably, the predispersed compositions of the present invention comprise from about 50 to about 60 percent by weight of the peroxide vulcanizing agent or coagent.

This is a significant increase in active dicumyl peroxide and α,α'-bis(t-butylperoxy)diisopropylbenzene content, for example, over the presently available predispersed peroxide products. Because the predispersed composition of the present invention can be at least 50 percent more active than the other, commercially available predispersed products, only two-thirds of the amount of predispersed product currently being employed must be added to the stock to obtain the same amount of active peroxide vulcanizing agent or coagent. Thus, a third less total material will have to be purchased, stored, weighed and handled with the attendant significant reduction in costs. In addition, much less undesired filler material is added to the rubber or plastic stock.

The production of a non-bleeding predispersed composition comprising up to about 70 percent by weight of a peroxide vulcanizing agent or coagent in a multi-stage graft copolymer which is thermally stable at elevated temperatures is unexpected. From the standpoint of safety, it would appear unwise to combine a high concentration of a highly reactive peroxide vulcanizing agent or coagent with a polymerizable organic copolymer because of the potential for an exothermic reaction. Moreover, the multi-stage graft copolymers in which the liquid or low melting solid peroxide vulcanizing agents or coagents are predispersed are of the type which are employed in the art as PVC impact modifiers. If the peroxide vulcanizing agents or coagents were to be used with such copolymers, they would be added in amounts of less than about 10 phr for the purpose of curing the copolymer.

It has been found, however, that this potential for an exothermic reaction between the peroxide vulcanizing agent or coagent and the graft copolymer can be eliminated by adding a very minor amount of a free radical polymerization inhibitor, i.e. free radical scavenger, to the predispersed composition. Suitable free radical polymerization inhibitors include hydroquinone, sodium sulfite, sodium sulfide, methyl ether hydroquinone (MEHQ), sodium polysulfide, diethyl hydroxyl amine (DEHA), N-phenyl-β-naphthylamine and the like. These free radical polymerization inhibitors are added to the predispersed composition in small but effective amounts of about 100 ppm to about 1000 ppm. When a free radical polymerization inhibitor is included in the predispersed composition, it has been found that the composition remains stable and does not exhibit an exotherm at temperatures of up to about 160° F. (70° C.).

To prepare predispersed compositions in accordance with the present invention, an appropriate amount of the multi-stage graft copolymer in finely divided powder form is first added to a separate vessel. If a finely divided reinforcing agent or filler material is to be used as a processing aid, the appropriate amount thereof is added to the vessel containing the finely divided copolymer and mixed therewith.

If the peroxide vulcanizing agent or coagent to be predispersed is a liquid at room temperature, it can be added directly to the vessel containing the finely divided graft copolymer mixed with the reinforcing agent or filler material, where employed, and blended together. Alternatively, the mixture of graft copolymer and reinforcing agent or filler material can be added to a vessel containing the liquid peroxide vulcanizing agent or coagent. However, those peroxide vulcanizing agents or coagents that are solids at room temperature must preferably be melted, for example, by immersing a vessel containing the solid in a hot water bath at a temperature above the melting point of the solid and below its decomposition or reaction temperature. A hot water bath at a temperature of about 130° F. to 140° F. has been found to be suitable. The molten compound can then be added to the mixture of finely divided graft copolymer and reinforcing agent or filler material and blended together with them. The liquid or molten peroxide vulcanizing agent or coagent quickly becomes absorbed by the copolymer particles. Alternatively, the mixture of graft copolymer and processing aid can be added to the vessel containing the molten peroxide vulcanizing agent or coagent. As a further alternative, the peroxide vulcanizing agent or coagent in solid form can be blended with the graft copolymer and reinforcing agents or fillers and then the mixture can be heated to melt the solid peroxide vulcanizing agent or coagent.

If the peroxide vulcanizing agent or coagent is a low melting solid, such as dicumyl peroxide, the resulting product is then kept warm at about 120° F. for a sufficient time to give the molten peroxide a chance to be absorbed by the graft copolymer. If the peroxide vulcanizing agent or coagent is a liquid at room temperature, the resulting product need not be kept warm after blending.

When a high molecular weight hydrocarbon polymer is used in the formulation as a processing aid, it is banded on a warm mill and the mixture of peroxide vulcanizing agent or coagent, graft copolymer, and optionally, reinforcing agent or filler material is mixed into it.

If the peroxide vulcanizing agent or coagent in the predispersed product is not a liquid at room temperature, it can be processed on a clean, preheated two-roll mill. The mill rolls should be heated to a temperature of about 100°-110° F. The warm mixture of peroxide vulcanizing agent or coagent, graft copolymer, and optionally reinforcing agent or filler material is placed on the preheated mill rolls where it is blended for a sufficient time to assure that a homogeneous mixture is prepared. If the peroxide vulcanizing agent or coagent is a liquid at room temperature, the mill need not be preheated. In either case, the predispersed composition is then sheeted off at a thickness of about 5 millimeters (3/16"). The sheet of product can then be diced or pelletized or left as a slab as desired. The predispersed compositions can also be mixed on any other suitable equipment known in the art, such as internal mixers.

When a free radical polymerization inhibitor is employed in the predispersed composition, it can be added to the composition at any time during processing. For example, it can be dissolved in the molten or liquid peroxide vulcanizing agent or coagent prior to addition of the peroxide vulcanizing agent or coagent to the finely divided graft copolymer or it can be added to the batch on the mill.

The predispersed peroxide vulcanizing agent or coagent compositions of the present invention, when uniformly dispersed into the rubber or plastic stock, provide vulcanizing characteristics equivalent to those obtained with peroxide vulcanizing agent or coagent alone, on an equal activity basis.

A more complete appreciation of the invention will be realized by reference to the following specific examples which relate to specific predispersed peroxide vulcanizing agent or coagent compositions and to methods for preparing such predispersed compositions. The following examples are not intended to limit the invention disclosed herein except to the extent that limitations are specifically stated or to the extent to which limitations appear in the appended claims.

EXAMPLE 1

A predispersed dicumyl peroxide composition was prepared by first immersing a jar containing 266.68 grams of 90% assay dicumyl peroxide (Di-Cup® T, Hercules, Inc.) in a hot water bath (130° F.–140° F.) for about 2 hours to melt the peroxide. Into a 2000 cc. beaker was weighed 121.32 grams of a methyl methacrylate-butyl acrylate multi-stage graft copolymer (Acryloid KM-323B, Rohm and Haas Co.) in fine, free-flowing powder form and 12.00 grams of pulverized polyethylene (Microthene FN-500, U.S. Industrial Chemicals Co.). The polymer powder and pulverized polyethylene were then blended by stirring with a large spatula. The molten dicumyl peroxide was then added to the beaker and the contents were stirred with the spatula until a homogeneous mixture was obtained. The beaker was then covered with aluminum foil and placed in an oven at 120° F. for 2 hours.

A two-roll laboratory mill was prepared by cleaning and then turning off the cooling water. Then 100 grams of clean rubber (Nordel 1070, du Pont) was placed on the mill with the nip on a tight setting. The rubber was then allowed to band and mix on the large roll until the rolls were heated to a temperature of about 105° F. The clean rubber was then removed from the warm mill rolls. The warm mixture of dicumyl peroxide, graft copolymer and pulverized polyethylene was then placed on the mill and blended for about 5 minutes to assure an homogeneous dispersion. The product was then sheeted off at a thickness of about 5 millimeters (3/16"). The predispersed product contained about 60 percent by weight of active dicumyl peroxide, about 30.33 percent by weight of graft copolymer, and about 3 percent by weight of pulverized polyethylene, with the remainder being unreacted starting materials from the technical grade dicumyl peroxide.

EXAMPLE 2

Using the procedure set forth in Example 1 above, 266.68 grams of 90% assay dicumyl peroxide (Di-Cup T) was predispersed in a mixture of 109.32 grams of a methyl methacrylate-butyl acrylate multi-stage graft copolymer (Acryloid KM-323B) and 24.00 grams of pulverized polyethylene (Microthene FN-500). The predispersed product that was prepared contained about 60 percent by weight of active dicumyl peroxide, about 27.33 percent by weight of graft copolymer, and about 6 percent by weight of pulverized polyethylene.

EXAMPLE 3

Using the procedure of Example 1 above, 260.9 grams of 92% assay dicumyl peroxide (Di-Cup T) was predispersed in a mixture of 123.1 grams of a methyl methacrylate-butyl acrylate multi-stage graft copolymer (Acryloid KM-323B) and 16.0 grams of pulverized polyethylene (Microthene FN-500). The predispersed product contained about 60 percent by weight of active dicumyl peroxide, about 30.8 percent by weight of graft copolymer, and about 4 percent by weight of pulverized polyethylene.

EXAMPLE 4

Using the procedure of Example 1 above, 326.1 grams of 92% assay dicumyl peroxide (Di-Cup T) was predispersed in a mixture of 153.9 grams of a methyl methacrylate-butyl acrylate multi-stage graft copolymer (Acryloid KM-323B) and 20.0 grams of a finely divided silica (Hi-Sil 233, Pittsburgh Plate Glass Co.). The processing of the mixture was found to be good. A predispersed product containing about 60 percent by weight of active dicumyl peroxide, about 30.8 percent by weight of graft copolymer, and about 4 percent by weight of silica was prepared.

EXAMPLE 5

Using the procedure of Example 1 above, 391.2 grams of 92% assay dicumyl peroxide (Di-Cup T) was predispersed in a mixture of 160.8 grams of a methyl methacrylate-butyl acrylate multi-stage graft copolymer (Acryloid KM-323B) and 48.0 grams of a finely divided silica (Hi-Sil 233). The processing of the mixture was found to be further improved and the product exhibited greater strength than with the pulverized polyethylene. The predispersed product contained about 60 percent by weight of active dicumyl peroxide, about 26.8 percent by weight of graft copolymer, and about 8 percent by weight of silica.

The percent by weight of each component in the predispersed products of Examples 1–5 is set forth below in Table I. The total percentage for the dicumyl peroxide and the unreacted starting materials in the technical grade dicumyl peroxide is listed. All of the predispersed compositions contained about 60 percent by weight of active dicumyl peroxide.

TABLE I

| Example No. | 1 | 2 | 3 | 4 | 5 |
|---|---|---|---|---|---|
| Di-Cup T | 66.67 | 66.67 | 65.2 | 65.2 | 65.2 |
| KM-323B | 30.33 | 27.33 | 30.8 | 30.8 | 26.8 |
| FN-500 | 3.0 | 6.0 | 4.0 | — | — |
| Hi-Sil 233 | — | — | — | 4.0 | 8.0 |

EXAMPLE 6

A predispersed dicumyl peroxide composition was prepared following the basic procedure set forth in Example 1 above with the exception that 0.1 gram of methyl ether hydroquinone (MEHQ) (Antioxidant #221, Arsynco Inc.) was dissolved in 391.2 grams of molten 92% assay dicumyl peroxide (Di-Cup T) prior to addition to a mixture of 166.7 grams of a methyl methacrylate-butyl acrylate multi-stage graft copolymer (Acryloid KM-323B) and 42.0 grams of finely divided silica (Hi-Sil 233). The predispersed product contained about 60 percent by weight of active dicumyl peroxide, about 0.02 percent by weight of MEHQ, about 27.8 percent by weight of graft copolymer, and about 7 percent by weight of silica.

A plant trial using this formulation was then run. Two pails each containing 40 lbs. of 92% assay dicumyl peroxide (Di-Cup T) were soaked in a hot water bath (130° F.) for 4½ hours to melt the peroxide. To one of the pails of molten peroxide was added 0.43 oz. (12 grams) of MEHQ. In an aluminum trough was mixed 34 lbs. 2 oz. of a methyl methacrylate-butyl acrylate multi-stage graft copolymer (Acryloid KM-323B) and 8 lbs. 9 oz. of finely divided silica (Hi-Sil 233). The two pails of molten peroxide were then added to the contents of the trough and mixed with hoe and shovel.

The mill rolls were heated by mixing Nordel 1040 on the mill with a small nip opening. When the temperature of the rolls was about 105° F., the rubber was removed and the mixture of peroxide, MEHQ, graft copolymer, and silica was placed on the mill and mixed for 5 minutes. Three rolls of the mixture were "pigged," allowed to sit for 20 minutes, and then mixed on the mill for an additional 5 minutes. The product was then sheeted off at a thickness of 5 millimeters (3/16") and placed on a cooling rack.

EXAMPLE 7

A predispersed dicumyl peroxide dispersion was prepared by first immersing a jar containing 360.0 grams of recrystallized dicumyl peroxide (Di-Cup ®R, Hercules Inc.) in a hot water bath (125° F.) for about 2 hours to melt the peroxide. Into a 2000 cc. beaker was weighed 185.9 grams of a methyl methacrylate-butyl acrylate multi-stage graft copolymer (Acryloid KM-323B), 36.0 grams of finely divided silica (Hi-Sil 233), and 18.0 grams of a liquid polymeric plasticizer (Paraplex G-62, Rohm and Haas Co.). All of the ingredients in the beaker were then stirred with a spatula. Into this mixture was blended 0.1 gram of methyl ether hydroquinone (MEHQ). The melted dicumyl peroxide was then added to the contents of the beaker and stirred with the spatula. The beaker was then covered with aluminum foil and placed in an oven at 120° F. for 4 hours. The warm mixture was then placed on a preheated two-roll mill (105° F.) and then mixed and sheeted off following the procedure of Example 1 above. Processing and dispersion of the product were found to be good. The predispersed product contained about 60 percent by weight of active dicumyl peroxide, about 31 percent by weight of graft copolymer, about 6 percent by weight of silica, about 3 percent by weight of the plasticizer and about 0.02 percent by weight of MEHQ.

EXAMPLE 8

A predispersed dicumyl peroxide composition was prepared by first soaking 143.9 grams of a methyl methacrylate-butyl acrylate multi-stage graft copolymer (Acryloid KM-323B) in deionized water overnight. The slurry of graft copolymer was then stirred and filtered through a large filter using sodium-free filter paper. The filtrate was rinsed 4 times with fresh deionized water and then dried to a moisture content of less than 0.5 percent. The graft copolymer was soaked and washed to reduce traces of sodium ion. The dried filtrate was added to a 2000 cc. beaker together with 30.0 grams of pulverized polyethylene (Microthene FN-500). A pre-blend of 0.1 gram of methyl ether hydroquinone (MEHQ) and 0.025 gram of an organic yellow dye (Seloil Yellow 16, Select Color Products Co.) was prepared by grinding with a mortar and pestle. Because such a small quantity of free radical polymerization inhibitor was used in the product, a yellow dye was mixed with the inhibitor so that one could readily ascertain whether it had been added. The pre-blend was then added to 326.0 grams of molten 92% assay dicumyl peroxide (Di-Cup T). The molten peroxide mixture was then added to the ingredients in the beaker and stirred. The beaker was then covered with aluminum foil and placed in an oven at 120° F. overnight. The warm mixture was then mixed on a preheated mill and sheeted off using the procedure of Example 1 above. The predispersed product contained about 60 percent by weight of active dicumyl peroxide, about 28.8 percent by weight of graft copolymer, about 6 percent by weight of pulverized polyethylene, about 0.02 percent by weight of MEHQ, and about 0.005 percent by weight of yellow dye.

EXAMPLE 9

Using the procedure of Example 8 above, 300.0 grams of molten recrystallized dicumyl peroxide (Di-Cup R) containing a pre-blend of 0.1 gram of methyl ether hydroquinone (MEHQ) and 0.025 gram of organic yellow dye (Seloil Yellow 16) was added to a beaker containing a mixture of 154.9 grams of a methyl methacrylate-butyl acrylate multi-stage graft copolymer (Acryloid KM-323B), 30.0 grams of pulverized polyethylene (Microthene FN-500), and 15.0 grams of a polymeric plasticizer (Paraplex G-62). The predispersed product contained about 60 percent by weight of active dicumyl peroxide, about 30.9 percent by weight of graft copolymer, about 6 percent by weight of pulverized polyethylene, about 3 percent by weight of plasticizer, about 0.02 percent by weight of MEHQ, and about 0.005 percent by weight of yellow dye.

EXAMPLE 10

Using the procedure of Example 6 above, a predispersed dicumyl peroxide composition was prepared. A pre-blend of 0.12 grams of methyl ethyl hydroquinone (MEHQ) and 0.03 grams of an organic blue dye (Omega Blue 153, Select Color Products Co.) was prepared by grinding with a mortar and pestle. The blue dye was pre-blended with the inhibitor so that it could be readily determined whether the final predispersed product contained the minor amount of inhibitor. The pre-blend of inhibitor and dye was added to a jar containing 391.2 grams of molten 92% assay dicumyl peroxide (Di-Cup T) that had been immersed in a hot water bath (130° F.). This molten peroxide mixture was then blended with a mixture of 166.65 grams of a methyl methacrylate-butyl acrylate multi-stage graft copolymer (Acryloid KM-323B) and 42.0 grams of finely divided silica (Hi-Sil 233). The resulting mixture was covered with aluminum foil and placed in an oven at 120° F. for 2 hours. The warm mixture was then placed on a two-roll mill and banded, milled and sheeted out in sheets about 5 millimeters (3/6″) in thickness. The sheets were then pelletized. The predispersed product contained about 60 percent by weight of active dicumyl peroxide, about 27.8 percent by weight of graft copolymer, about 7 percent by weight of silica, about 0.02 percent by weight of MEHQ, and about 0.005 percent by weight of dye.

EXAMPLE 11

Using the procedure of Example 10 above, 360.0 grams of molten recrystallized dicumyl peroxide (Di-Cup R) containing 0.12 gram of methyl ether hydroquinone (MEHQ) and 0.03 gram of organic blue dye (Omega Blue 153) was dispersed in a mixture of 179.85 grams of a methyl methacrylate-butyl acrylate multi-stage graft copolymer (Acryloid KM-323B), 42.0 grams of finely divided silica (Hi-Sil 233) and 18.0 grams of liquid polymeric plasticizer (Paraplex G-62). The predispersed peroxide product contained about 60 percent by weight of active dicumyl peroxide, about 29.9 percent by weight of graft copolymer, about 7 percent by weight of silica, about 3 percent by weight of plasticizer, about 0.02 percent by weight of MEHQ, and about 0.005 percent by weight of blue dye.

EXAMPLE 12

Using the procedure of Example 10 above, 360.0 grams of molten recrystallized dicumyl peroxide (Di-Cup R) containing 0.12 gram of methyl ether hydroquinone (MEHQ) and 0.03 gram of organic blue dye (Omega Blue 153) was dispersed in a mixture of 179.85 grams of a methyl methacrylate-butyl acrylate multi-stage graft copolymer (Acryloid KM-323B), 42.0 grams of finely divided silica (Hi-Sil 233) and 18.0 grams of dioctyl phthalate (DOP). The predispersed peroxide product contained about 60 percent by weight of active dicumyl peroxide, about 29.9 percent by weight of graft copolymer, about 7 percent by weight of silica, about 3 percent by weight of DOP, about 0.02 percent by weight of MEHQ, and about 0.005 percent by weight of blue dye.

EXAMPLE 13

Following the procedure set forth in Example 8 above, 185.85 grams of washed methyl methacrylate-butyl acrylate multi-stage graft copolymer (Acryloid KM-323B) was mixed with 36.0 grams of pulverized polyethylene (Microthene FN-500) in a 2000 cc. beaker. To this mixture was added 360.0 grams of molten recrystallized dicumyl peroxide (Di-Cup R) containing 0.12 gram of methyl ether hydroquinone (MEHQ) and 0.03 gram of organic yellow dye (Seloil Yellow 16) which was stirred in with a spatula. Then, 18.0 grams of dioctyl phthalate (DOP) was added to the mixture and stirred in. The beaker was then covered with aluminum foil and placed in an oven at 120° F. For 2 hours. The warm mixture was then placed on a prewarmed two-roll laboratory mill at 105° F., banded, milled and sheeted off. The predispersed product contained about 60 percent by weight of active dicumyl peroxide, about 30.9 percent by weight of graft copolymer, about 6 percent by weight of pulverized polyethylene, about 3 percent by weight of DOP, about 0.02 percent by weight of MEHQ, and about 0.005 percent by weight of yellow dye.

EXAMPLE 14

Following the procedure of Example 13 above, 391.2 grams of molten 92% assay dicumyl peroxide (Di-Cup T) containing 0.12 gram of methyl ether hydroquinone (MEHQ) and 0.03 gram of an organic yellow dye (Seloil Yellow 16) was predispersed in a mixture of 172.65 grams of a washed methyl methacrylate-butyl acrylate multi-stage graft copolymer (Acryloid KM-323B), 18.0 grams of finely divided silica (Hi-Sil 233), and 18.0 grams of pulverized polyethylene (Microthene FN-500). The predispersed peroxide product contained about 60 percent by weight of active dicumyl peroxide, about 28.8 percent by weight of graft copolymer, about 3 percent by weight of silica, about 3 percent by weight of pulverized polyethylene, about 0.02 percent by weight of MEHQ, and about 0.005 percent by weight of yellow dye.

The percent by weight of each component in the predispersed products of Examples 6-14 is set forth in Table II below. The total percentage for the dicumyl peroxide and the unreacted starting materials in the technical grade dicumyl peroxide is listed. All of the predispersed compositions contained about 60 percent by weight of active dicumyl peroxide.

the mill with the nip on a tight setting. The rubber was then allowed to band and mix on the large roll until the rolls were heated to a temperature of about 105° F. The clean rubber was then removed from the warm mill rolls. At this point, 32 grams of an ethylene-propylene copolymer (Royalene 100, Uniroyal, Inc.) was placed on the mill and allowed to band on the roll. The mixture of peroxide, graft copolymer, finely divided silica and MEHQ was then placed on the mill and blended into the ethylene-propylene copolymer. Assured of a homogeneous dispersion, the product was then sheeted off at a thickness of about 5 millimeters (3/16 inch). The predispersed product contained about 60 percent by weight of active peroxide, about 25 percent by weight of graft copolymer, about 7 percent by weight of silica, about 8 percent by weight of ethylene-propylene copolymer and about 0.02 percent by weight of MEHQ.

EXAMPLE 16

A predispersed triallyl isocyanurate (TAIC) composition was prepared by first weighing 80 grams of a methyl methacrylate-butyl acrylate multi-stage graft copolymer in fine, free flowing powder form (Acryloid KM-323B) and 36 grams of powdered silicon dioxide (Hi-Sil 233) into a 1000 ml. beaker. The graft copolymer powder and finely divided silica were then blended by stirring with a large spatula. To this mixture was added 0.4 grams of methyl ether hydroquinone (MEHQ) which was again stirred in with a spatula. Then, 240 grams of liquid TAIC was added to the beaker and the contents were stirred with the spatula until a homogeneous mixture was obtained. The beaker was covered with aluminum foil and allowed to stand at room temperature for a short period of time.

TABLE II

| Example No. | 6 | 7 | 8 | 9 | 10 | 11 | 12 | 13 | 14 |
|---|---|---|---|---|---|---|---|---|---|
| Di-Cup R | — | 60.0 | — | 60.0 | — | 60.0 | 60.0 | 60.0 | — |
| DiCup T | 65.2 | — | 65.2 | — | 65.2 | — | — | — | 65.2 |
| KM-323B | 27.8 | 31.0 | 28.8 | 30.9 | 27.8 | 29.9 | 29.9 | 30.9 | 28.8 |
| FN-500 | — | — | 6.0 | 6.0 | — | — | — | 6.0 | 3.0 |
| Hi-Sil 233 | 7.0 | 6.0 | — | — | 7.0 | 7.0 | 7.0 | — | 3.0 |
| Paraplex G-62 | — | 3.0 | — | 3.0 | — | 3.0 | — | — | — |
| DOP | — | — | — | — | — | — | 3.0 | 3.0 | — |
| MEHQ | 0.02 | 0.02 | 0.02 | 0.02 | 0.02 | 0.02 | 0.02 | 0.02 | 0.02 |
| Yellow dye | — | — | 0.005 | 0.005 | — | — | — | 0.005 | 0.005 |
| Blue dye | — | — | — | — | 0.005 | 0.005 | 0.005 | — | — |

EXAMPLE 15

A predispersed α,α'-bis(t-butylperoxy)diisopropylbenzene composition was prepared by first immersing a 1000 ml. beaker containing 240 grams of 96-100% assay recrystallized α,α'-bis(t-butylperoxy)diisopropylbenzene (Vul-Cup R, Hercules, Inc.) into a hot water bath (140°-160° F.) for about one-half hour to melt the peroxide. Into a 400 ml. beaker was weighed 100 grams of a methyl methacrylate-butyl acrylate multi-stage graft copolymer (Acryloid KM-323B) in fine, free-flowing powder form, 28.0 grams of powdered silicon dioxide (Hi-Sil 233) and 0.08 grams of methyl ether hydroquinone (MEHQ). The graft copolymer, silica and MEHQ were then dry blended by stirring with a large spatula. This powdered mixture was then added slowly to the beaker containing the molten peroxide with stirring with the spatula until a homogeneous mixture was obtained.

A two-roll laboratory mill was prepared by cleaning and then turning off the cooling water. Then 100 grams of clean rubber (Nordel 1070, duPont) was placed on A two-roll laboratory mill was cleaned and prepared. Then, 44 grams of an ethylene-propylene copolymer (EPR 404, Exxon) was placed on the mill with the nip on a tight setting. The rubber was then allowed to band on the roll, which remained cool. The mixture of TAIC, graft copolymer, silica and MEHQ was then placed on the mill and blended with the ethylene-propylene copolymer. After assuring the homogeneity of the dispersion, the product was then sheeted off at a thickness of approximately 5 millimeters (3/16 inch). The predispersed product contained about 60 percent by weight of triallyl isocyanurate, about 20 percent by weight of graft copolymer, about 11 percent by weight of ethylene-propylene copolymer, about 9 percent by weight of silica and about 0.1 percent by weight of MEHQ.

EXAMPLE 17

Using the procedure set forth in Example 16 above, 240 grams of triallyl trimellitate (TATM) (R. T. Vanderbilt Co.) was predispersed in a mixture of 80 grams of a methyl methacrylate-butyl acrylate multi-stage graft copolymer (Acryloid KM-323B), 36 grams of a finely divided silicon dioxide (Hi-Sil 233) and 0.4 grams of methyl ether hydroquinone (MEHQ). This homogeneous mixture was then milled into 44 grams of clean banded ethylene-propylene copolymer (Royalene 100) and blended until a homogeneous dispersion resulted. The product was sheeted off the mill at a thickness of approximately 5 millimeters (3/16 inch). The predispersed product that was prepared contained about 60 percent by weight of TATM, about 20 percent by weight of graft copolymer, about 11 percent by weight of ethylene-propylene copolymer, about 9 percent by weight of silica and about 0.1 percent by weight of MEHQ.

EXAMPLE 18

A predispersed trimethylolpropane triacrylate (TMPTA) composition was prepared by first weighing into a 400 ml. beaker 33 grams of a methyl methacrylate-butyl acrylate multi-stage graft copolymer (Acryloid KM-323B) in a fine, free-flowing powder form and 7 grams of powdered silicon dioxide (Hi-Sil 233). The powdered graft copolymer and finely divided silica were then dry blended by stirring with a large spatula. To this mixture was added 0.4 grams of methyl ethyl hydroquinone (MEHQ) which was stirred in with a spatula. Then, 60 grams of liquid trimethylolpropane triacrylate (Sartomer SR 351, Sartomer Co.) was then added to the beaker and the contents were stirred with the spatula until a homogeneous mixture was obtained. The beaker was covered with aluminum foil and allowed to stand at room temperature for approximately 15 minutes. The mixture was placed on a cool, two roll mill and then mixed and sheeted off the mill at a thickness of approximately 5 millimeters (3/16 inch). The predispersed product contained about 60 percent by weight of TMPTA, 33 percent by weight of graft copolymer, 7 percent by weight of silica and about 0.4 percent by weight of MEHQ.

EXAMPLE 19

Using the procedure set forth in Example 10, above, 192.6 grams of 93.5% assay dicumyl peroxide (Di-Cup T) was predispersed in a mixture of 86.4 grams of methyl methacrylate-styrene-butadiene multi-stage graft copolymer (Acryloid KM-611, Rohm and Haas Co.), 21 grams of powdered silica (Hi-Sil 233), 0.06 grams of methyl ether hydroquinone (MEHQ) and 0.015 grams of an organic blue dye (Omega Blue 153). The predispersed product that was prepared contained about 60% by weight of active dicumyl peroxide, about 28 percent by weight of the graft copolymer, about 7 percent by weight of finely divided silica, about 0.02 percent by weight of MEHQ and about 0.005 percent by weight of blue dye, with the remainder being unreacted starting materials from the technical grade dicumyl peroxide.

The percent by weight of each component in the predispersed products of Examples 15-19 is set forth in Table III below. For Example 19, the total percentage of the dicumyl peroxide and the unreacted starting materials in the technical grade dicumyl peroxide is listed.

TABLE III

| Example No. | 15 | 16 | 17 | 18 | 19 |
|---|---|---|---|---|---|
| Di-Cup T | — | — | — | — | 64.2 |
| Vul-Cup R | 60 | — | — | — | — |

TABLE III-continued

| Example No. | 15 | 16 | 17 | 18 | 19 |
|---|---|---|---|---|---|
| TAIC | — | 60 | — | — | — |
| TATM | — | — | 60 | — | — |
| TMPTA | — | — | — | 60 | — |
| KM-323B | 25 | 20 | 20 | 33 | — |
| KM-611 | — | — | — | — | 28.8 |
| Hi-Sil 233 | 7 | 9 | 9 | 7 | 7 |
| Royalene 100 | 8 | — | 11 | — | — |
| EPR 404 | — | 11 | — | — | — |
| MEHQ | 0.02 | 0.1 | 0.1 | 0.4 | 0.02 |
| Blue Dye | — | — | — | — | 0.005 |

EXAMPLES 20-22

Using the procedure of Examples 6 and 18 above, three predispersed compositions comprising 50 percent by weight of dicumyl peroxide, triallyl trimellitate (TATM), and trimethylolpropane triacrylate (TMPTA) were prepared. In a first beaker, 54.35 grams of molten 92% assay dicumyl peroxide (Di-Cup T) was mixed homogeneously with 36.45 grams of a methyl methacrylate-styrene-butadiene multi-stage graft copolymer (Acryloid KM-611), 9 grams of finely divided silica (Hi-Sil 233) and 0.2 grams of methyl ether hydroquinone (MEHQ). In two further beakers, 50 grams of triallyl trimellitate (R. T. Vanderbilt Co.) and 50 grams of trimethylolpropane triacrylate (Sartomer SR 351) were each mixed thoroughly with 40.6 grams of the graft copolymer, 9 grams of the finely divided silica, and 0.4 grams of MEHQ. Each of the three predispersed compositions was easy to process on a two-roll mill. The percent by weight of each component in these predispersed compositions is set forth in Table IV below. For Example 20, the total percentage for the dicumyl peroxide and the unreacted starting materials in the technical grade dicumyl peroxide is listed.

TABLE IV

| Example No. | 20 | 21 | 22 |
|---|---|---|---|
| Di-Cup T | 54.35 | — | — |
| TATM | — | 50.0 | — |
| TMPTA | — | — | 50.0 |
| KM-611 | 36.45 | 40.6 | 40.6 |
| Hi-Sil 233 | 9.0 | 9.0 | 9.0 |
| MEHQ | 0.2 | 0.4 | 0.4 |

EXAMPLES 23-32

A series of predispersed compositions comprising 40 percent by weight of peroxide vulcanizing agent or coagent were prepared using the procedure of Examples 6 and 18 above. Technical grade 92% assay dicumyl peroxide (Di-Cup T), recrystallized dicumyl peroxide (Di-Cup R), recrystallized α,α'-bis(t-butylperoxy)-diisopropylbenzene (Vul-Cup R), trimethylolpropane triacrylate (TMPTA) (Sartomer SR 351), and triallyl trimellitate (TATM) (R. T. Vanderbilt Co.) were each mixed with two compositions containing a graft copolymer, finely divided silica (Hi-Sil 233) and methyl ether hydroquinone (MEHQ). One of the compositions contained a methyl methacrylate-butyl acrylate multi-stage graft copolymer (Acryloid KM-323B, Rohm and Haas Co.) and the other contained a methyl methacrylate-styrene-butadiene multi-stage copolymer (Acryloid KM-611). The amounts of each component in grams for each of the predispersed compositions are set forth in Table V below. The compositions of Examples 23, 24, 26, 28 and 30-32 were found to be easy to process on a two-roll mill. The compositions of Examples 25, 27 and 29 were fairly easy to process, but were found to be slightly "boardy."

EXAMPLES 33–42

A series of predispersed compositions comprising 30 percent by weight of peroxide vulcanizing agent or coagent were prepared using the procedure of Examples 6 and 18 above. Technical grade 92% assay dicumyl peroxide (Di-Cup T), recrystallized dicumyl peroxide (Di-Cup R), recrystallized α,α'-bis(t-butylperoxy)-diisopropylbenzene (Vul-Cup R) trimethylolpropane triacrylate (TMPTA) (Sartomer SR 351), and triallyl trimellitate (TATM) (R. T. Vanderbilt Co.) were each mixed with two compositions containing a graft copolymer and methyl ether hydroquinone (MEHQ). One of the compositions contained a methyl methacrylate-butyl acrylate multi-stage graft copolymer (Acryloid KM-323B) and the other contained a methyl methacrylate-styrene-butadiene multi-stage graft copolymer (Acryloid KM-611). The amounts of each component in grams for each of the predispersed compositions are set forth in Table VI below. The compositions of Examples 33, 37 and 38 were found to be boardy and difficult to process on a two-roll mill. Those of Examples 35, 39 and 41 were only slightly boardy and fairly easy to process. The compositions of Examples 34, 36, 40 and 42 were found to be very easy to process.

mixture of t-butyl cumyl peroxide, graft copolymer, silica and MEHQ was then added to the ethylene-propylene-diene terpolymer on the mill and blended until a homogeneous dispersion was assured. The product was then sheeted off the mill at a thickness of approximately 5 mm. (3/16 inch). The product could be processed easily on the mill. The predispersed product contained about 60 percent by weight of active peroxide, about 26.1 percent by weight of graft copolymer, about 4 percent by weight of silica, about 5 percent by weight of ethylene-propylene-diene terpolymer, about 0.02 percent by weight of MEHQ and about 0.005 percent by weight of yellow dye.

EXAMPLE 44

Using the procedure of Example 21 above, a predispersed composition comprising about 60 percent by weight of triallyl trimellitate (TATM) was prepared. In a large beaker was blended 140.0 grams of methyl methacrylate-butyl acrylate multi-stage graft copolymer (Acryloid KM-323B), 19.6 grams of fumed silica (Cab-O-Sil MS-7, Cabot Corp.), 0.4 gram of the pre-blend of 4 parts methyl ether hydroquinone (MEHQ) and 1 part organic yellow dye (Seloil Yellow 16), and 240.0 grams of triallyl trimellitate (R. T. Vanderbilt Co.). The contents of the beaker were stirred with a spatula until a homogeneous mixture was obtained. The mixture was then placed on a clean two-roll mill, banded and milled

TABLE V

| Example No. | 23 | 24 | 25 | 26 | 27 | 28 | 29 | 30 | 31 | 32 |
|---|---|---|---|---|---|---|---|---|---|---|
| Di-Cup T | 43.48 | 43.48 | — | — | — | — | — | — | — | — |
| Di-Cup R | — | — | 40.0 | 40.0 | — | — | — | — | — | — |
| Vul-Cup R | — | — | — | — | 40.0 | 40.0 | — | — | — | — |
| TMPTA | — | — | — | — | — | — | 40.0 | 40.0 | — | — |
| TATM | — | — | — | — | — | — | — | — | 40.0 | 40.0 |
| KM-323B | 47.32 | — | 50.8 | — | 50.8 | — | 50.6 | — | 50.6 | — |
| KM-611 | — | 47.32 | — | 50.8 | — | 50.8 | — | 50.6 | — | 50.6 |
| Hi-Sil 233 | 9.0 | 9.0 | 9.0 | 9.0 | 9.0 | 9.0 | 9.0 | 9.0 | 9.0 | 9.0 |
| MEHQ | 0.2 | 0.2 | 0.2 | 0.2 | 0.2 | 0.2 | 0.4 | 0.4 | 0.4 | 0.4 |

TABLE VI

| Example No. | 33 | 34 | 35 | 36 | 37 | 38 | 39 | 40 | 41 | 42 |
|---|---|---|---|---|---|---|---|---|---|---|
| Di-Cup T | 32.6 | 32.6 | — | — | — | — | — | — | — | — |
| Di-Cup R | — | — | 30.0 | 30.0 | — | — | — | — | — | — |
| Vul-Cup R | — | — | — | — | 30.0 | 30.0 | — | — | — | — |
| TMPTA | — | — | — | — | — | — | 30.0 | 30.0 | — | — |
| TATM | — | — | — | — | — | — | — | — | 30.0 | 30.0 |
| KM-323B | 67.4 | — | 70.0 | — | 70.0 | — | 70.0 | — | 70.0 | — |
| KM-611 | — | 67.4 | — | 70.0 | — | 70.0 | — | 70.0 | — | 70.0 |
| MEHQ | 0.1 | 0.1 | 0.1 | 0.1 | 0.1 | 0.1 | 0.1 | 0.1 | 0.1 | 0.1 |

EXAMPLE 43

A predispersed t-butyl cumyl peroxide (t-BCP) composition was prepared using the procedure set forth in Example 16 above. Into a large beaker was added 104.4 grams of a methyl methacrylate-butyl acrylate multistage graft copolymer (Acryloid KM-323B), 16.0 grams of finely divided silica (Hi-Sil 233), 0.1 gram of a pre-blend of 4 parts methyl ether hydroquinone (MEHQ) and 1 part of organic yellow dye (Seloil Yellow 16), and 259.6 grams of a 92.5% assay t-butyl cumyl peroxide (Lupersol 801, Lucidol Div., Pennwalt Corp.). The contents of the beaker were stirred with a spatula until a homogeneous mixture was obtained.

A two-roll laboratory mill was cleaned and prepared. Then, 20.0 grams of an ethylene-propylene-diene terpolymer (Nordel 1040, duPont) was placed on the mill with a tight nip setting and banded on the roll. The until a homogeneous dispersion was assured, and then sheeted off. The product could be processed readily on the mill. The product contained about 60 percent by weight of TATM, about 35 percent by weight of graft copolymer, about 4.9 percent by weight of fumed silica, about 0.08 percent by weight of MEHQ, and about 0.02 percent by weight of yellow dye.

EXAMPLES 45–47

A series of predispersed triallyl trimellitate (TATM) compositions were prepared using the procedure of Example 17 above. In a beaker were mixed 7 grams of TATM and 3 grams of methyl methacrylate-butyl acrylate multi-stage graft copolymer (Acryloid KM-323B). The mixture was added to a two-roll mill and blended. Although the predispersed product was non-bleeding and held all of the TATM, it was cakey and did not have enough strength to be processed on a mill. A second predispersed product was made by mixing 7 grams of TATM, 2 grams of the graft copolymer and 1 gram of fumed silica (Cab-O-Sil MS-7). This mixture was much tougher than the first predispersion and could be squeezed on the mill, but it broke easily and did not have enough strength or flexibility to be pulled off. A third predispersed product was prepared by mixing 420 grams of TATM, 114 grams of graft copolymer and 5 grams of fumed silica. The mixture was allowed to stand for 1 hour. Then 36 grams of ethylene propylene copolymer (Royalene 100) was placed on a mill and banded. The mixture containing TATM was then milled into the ethylene-propylene copolymer on the mill. Although the mixture had a tendency to slide on the rolls and not band, after being thoroughly mixed, the product could be sheeted off at a thickness of approximately 5 mm. (3/16 inch). The product could be torn easily and required a little more strength.

The percent by weight of each component of the predispersed compositions of Examples 43–47 is set forth in Table VII below. For Example 43, the total percentage of 92.5% assay t-butyl cumyl peroxide is listed. The predispersed composition contained 60 percent by weight of active peroxide.

EXAMPLE 48

A predispersed t-butyl cumyl peroxide (t-BCP) composition was prepared by mixing 70.0 grams of 92.5% assay t-butyl cumyl peroxide (Lupersol 801), 25.0 grams of methyl methacrylate-styrene-butadiene multi-stage graft copolymer (Acryloid KM-611), 5.0 grams of fumed silica (Cab-O-Sil MS-7) and 0.02 grams of methyl ether hydroquinone (MEHQ) using the procedure of Example 43 above. The mixture was then placed on a two-roll mill, banded, mixed until homogeneous, and then sheeted off. The predispersed composition could be easily processed. The product comprised about 64.8 percent by weight of t-butyl cumyl peroxide, about 25 percent by weight of graft copolymer, about 5 percent by weight of fumed silica, and about 0.02 percent MEHQ.

EXAMPLES 49–50

Using the procedure of Example 44 above, two predispersed compositions comprising about 50 percent by weight of 2,5-dimethyl-2,5-bis(t-butylperoxy) hexyne-3 were prepared. In a beaker were dry blended 5.6 grams of a methyl methacrylate-butyl acrylate multi-stage graft copolymer (Acryloid KM-323B) and 0.4 gram of fumed silica (Cab-O-Sil MS-7). In a second beaker were dry blended 5.6 grams of a methyl methacrylate-styrene-butadiene multi-stage graft copolymer (Acryloid KM-611) and 0.4 gram of fumed silica (Cab-O-Sil MS-7). To each of these mixtures were added 6.0 grams of liquid 2,5-dimethyl-2,5-bis(t-butylperoxy) hexyne-3 (Lupersol 130, Lucidol Div., Pennwalt Corp.). The contents of each beaker was then stirred with a spatula until a homogeneous mixture was obtained. Although both products were non-bleeding and held all of the liquid peroxide, they were too powdery to process on a two-roll mill. The compositions did not form a sheet but broke up and fell into the pan. Both products contained about 50 percent by weight of 2,5-dimethyl-2,5-bis(t-butylperoxy) hexyne-3, about 46.7 percent by weight of graft copolymer, and about 3.3 percent by weight of fumed silica.

EXAMPLES 51–52

Using the procedure of Example 44 above, two predispersed compositions comprising about 50 percent by weight of 2,5-bis(t-butylperoxy)-2,5-dimethylhexane were prepared. In a beaker were dry blended 5.6 grams of a methyl methacrylate-butyl acrylate multi-stage graft copolymer (Acryloid KM-323B) and 0.4 gram of fumed silica (Cab-O-Sil MS-7). In a second beaker were dry blended 5.6 grams of a methyl methacrylate-styrene-butadiene multi-stage graft copolymer (Acryloid KM-611) and 0.4 gram of fumed silica (Cab-O-Sil MS-7). To each of these mixtures were added 6.0 grams of liquid 2,5-bis(t-butylperoxy)-2,5-dimethylhexane (Varox Liquid, R. T. Vanderbilt Co.). The contents of each beaker was then stirred with a spatula until a homogeneous mixture was obtained. Although both products were non-bleeding and held all of the liquid peroxide, they were too powdery to process on a two-roll mill. The compositions did not form a sheet but broke up and fell into the pan. Both products contained about 50 percent by weight of 2,5-bis(t-butylperoxy)-2,5-dimethylhexane, about 46.7 percent by weight of graft copolymer, and about 3.3 percent by weight of fumed silica.

EXAMPLES 53–54

Using the procedure of Example 44 above, two predispersed compositions comprising about 60 percent by weight of trimethylolpropane trimethacrylate (TMPTMA) were prepared. In one beaker were dry blended 3.5 grams of a methyl methacrylate-butyl acrylate multi-stage graft copolymer (Acryloid KM-323B) and 0.5 gram of fumed silica (Cab-O-Sil MS-7). In a second beaker was dry blended 3.5 grams of a methyl methacrylate-styrene-butadiene multi-stage graft copolymer (Acryloid KM-611) and 0.5 gram of fumed silica (Cab-O-Sil MS-7). To each of these mixtures were added 6.0 grams of trimethylolpropane trimethacrylate (Monomer X980, Rohm and Haas Co.) and 0.0024 gram of methyl ether hydroquinone (MEHQ). The contents of each beaker were then stirred until a homogeneous mixture was obtained. Each mixture was then placed on a clean two-roll mill, banded and milled until a homogeneous dispersion was obtained, and then sheeted off. Both mixtures could be processed easily on the mill into thin flexible sheets. Both predispersed products contained about 60 percent by weight of TMPTMA, about 35 percent by weight of graft copolymer, about 5 percent by weight of fumed silica, and about 0.02 percent by weight of MEHQ.

The percent by weight of each component in the predispersed compositions of Examples 48–54 is set forth in Table VIII below. For Example 48, the total percentage of 92.5% assay t-butyl cumyl peroxide is listed.

TABLE VII

| Example No. | 43 | 44 | 45 | 46 | 47 |
|---|---|---|---|---|---|
| t-BCP | 64.9 | — | — | — | — |
| TATM | — | 60.0 | 70.0 | 70.0 | 70.0 |
| KM-323B | 26.1 | 35.0 | 30.0 | 20.0 | 19.0 |
| HiSil 233 | 4.0 | — | — | — | — |
| Cab-O-Sil MS-7 | — | 4.9 | — | 10.0 | 5.0 |
| Nordel 1040 | 5.0 | — | — | — | — |
| Royalene 100 | — | — | — | — | 6.0 |
| MEHQ | 0.02 | 0.08 | — | — | — |
| Yellow dye | 0.005 | 0.02 | — | — | — |

TABLE VIII

| Example No. | 48 | 49 | 50 | 51 | 52 | 53 | 54 |
|---|---|---|---|---|---|---|---|
| t-BCP | 70.0 | — | — | — | — | — | — |
| Lupersol 130 | — | 50.0 | 50.0 | — | — | — | — |
| Varox Liquid | — | — | — | 50.0 | 50.0 | — | — |
| TMPTMA | — | — | — | — | — | 60.0 | 60.0 |
| KM-323B | — | 46.7 | — | 46.7 | — | 35.0 | — |
| KM-611 | 25.0 | — | 46.7 | — | 46.7 | — | 35.0 |
| Cab-O-Sil MS-7 | 5.0 | 3.3 | 3.3 | 3.3 | 3.3 | 5.0 | 5.0 |
| MEHQ | 0.02 | — | — | — | — | 0.02 | 0.02 |

EXAMPLE 55

A methyl methacrylate-ethyl acrylate multi-stage graft copolymer was prepared using the following procedure. Initially, 1.2 grams of potassium persulfate (Fisher Scientific) was dissolved in 98.8 grams of distilled water. Then, 1.4 grams of sodium formaldehyde sulfoxylate (Hydrosulfite AWC PEA, Diamond Shamrock) was weighed into a 100 ml. volumetric flask and brought up to volume with distilled water. Into a three-neck flask was weighed 280 grams of distilled water, 0.67 gram of a 30% solution of sodium lauryl sulfate (Maprofix LCP, Onyx Chemical Co.), 10.0 grams of ethyl acrylate (Rohm and Haas Co.) and 0.2 grams of 1,3-butylene dimethacrylate (Rocryl 970, Rohm and Haas Co.). The three-neck flask was then set up on a hotplate/stirrer and a thermometer, a reflux condenser and a stopper were inserted in the necks of the flask. Nitrogen was then hooked up to the thermometer side and the hose from the condenser was vented to the hood. After agitation was begun, the flask was gently purged with nitrogen for 2 minutes. After removing the stopper, 1.0 ml. of the potassium persulfate solution and 1.0 ml. of the sodium formaldehyde sulfoxylate solution were added to the flask. The stopper was then replaced and the flask was heated to a temperature of 70°–80° C. while stirring. After a temperature of 70°–80° C. was reached, the heat was turned off and the temperature was allowed to drop to about 40° C. During the cooling period, 88.0 grams of methyl methacrylate (Rohm and Haas Co.), 1.8 grams of 1,3-butylene dimethacrylate, and 0.2 grams of t-dodecyl mercaptan (Phillips Petroleum) were weighed into a 100 ml. cylindrical separatory funnel. While stirring, 5.8 ml. of the sodium lauryl sulfate solution, 9.0 ml. of the sodium formaldehyde sulfoxylate solution, and 9.0 ml. of the potassium persulfate solution were added to the three-neck flask. The separatory funnel containing the methyl methacrylate mixture was then placed on and the contents added to the three-neck flask. Then, the heat was turned on and the temperature was allowed to rise to about 70° C. at which point the heat was turned down and the reaction allowed to proceed at a temperature of about 70°–80° C. for 2 hours. After 2 hours, the heat was turned off and 1.0 ml. of the sodium formaldehyde sulfoxylate solution and 1.0 ml. of the potassium persulfate solution were added down the reflux condenser, and the mixture was allowed to cool slowly to room temperature. The mixture was then poured into a pyrex dish and dried. The product was a multi-stage graft copolymer in which the first stage was cross-linked ethyl acrylate, which represented about 10 percent by weight of the total product, and the second stage was cross-linked methyl methacrylate grafted to the first stage, which represented about 90 percent by weight of the total product.

Using the procedure of Example 6 above, 35.0 grams of the methyl methacrylate-ethyl acrylate multi-stage graft copolymer prepared above was mixed with 60.0 grams of molten recrystallized dicumyl peroxide (Di-Cup R), 5.0 grams of fumed silica (Cab-O-Sil MS-7) and 0.02 grams of methyl ether hydroquinone (MEHQ). The mixture was then placed on a two-roll mill, banded and milled until a homogeneous dispersion was obtained, and then sheeted off. The mixture could be processed easily on the mill, although it was a slight bit tacky. The predispersed product contained about 60 percent by weight of dicumyl peroxide, about 35 percent by weight of graft copolymer, about 5 percent by weight of fumed silica, and about 0.02 percent by weight of MEHQ.

EXAMPLE 56

A methyl methacrylate-styrene-butadiene multi-stage graft copolymer was prepared as follows. Initially, 1.36 grams of potassium persulfate was dissolved in 98.64 grams of distilled water. Then, 0.68 gram of sodium formaldehyde sulfoxylate (Hydrosulfite AWC PEA) was weighed into a 100 ml. volumetric flask and brought up to volume with distilled water. Into a three-neck flask was weighed 65.94 grams of 45.5% of a carboxylated SBR latex with 39% bound styrene (Polysar 6500-LS, Polysar Ltd.) and 34.0 grams of styrene. The three-neck flask was then set up on a hotplate/stirrer and a thermometer, a reflux condenser and a stopper were inserted in the necks. Nitrogen was then hooked up to the thermometer side of the flask and the hose from the reflux condenser was vented to the hood. After agitation was begun, the flask was gently purged with nitrogen for 5 minutes. Then, 10 ml. of the sodium formaldehyde sulfoxylate solution and 10 ml. of the potassium persulfate solution were added to the flask. The flask was then heated to a temperature of about 80° C. while stirring. After the temperature reached 80° C., the heat was turned off and the temperature was allowed to cool down to about 40° C. while still stirring. Then, 35.0 grams of methyl methacrylate and 0.35 gram of 1,3-butylene dimethacrylate (Rocryl 970) were weighed into a cylindrical separatory funnel which was placed on the flask and the contents added. After addition of 10 ml. of the sodium formaldehyde sulfoxylate solution and 10 ml. of the potassium persulfate solution, the flask was heated to a temperature of about 80° C. The reaction was allowed to proceed at a temperature of about 70°–80° C. for 1 hour. After 1 hour, the heat was turned off and the mixture was allowed to cool to about 40° C. The mixture was then removed from the flask and dried. The product was a multi-stage graft copolymer comprising a hard portion with about 35 percent by weight of cross-linked methyl methacrylate grafted onto about 35 percent by weight of styrene grafted onto a rubbery portion with about 30 percent by weight of styrene-butadiene copolymer.

Using the procedure of Example 6 above, 30.0 grams of the methyl methacrylate-styrene-butadiene multi-stage graft copolymer prepared above was mixed with 60.0 grams of molten recrystallized dicumyl peroxide (Di-Cup R), 7.0 grams of finely divided silica (Hi-Sil 233), 3.0 grams of dioctyl phthalate (DOP), and 0.02 gram of methyl ether hydroquinone (MEHQ). The mixture was then placed on a two-roll mill, banded and milled until a homogeneous dispersion was obtained. The resulting mixture was non-bleeding, although it was too soft to remove easily from the mill. An additional 20.0 grams of silica (Hi-Sil 233) was milled in with the mixture. The product, which was boardly and slightly sticky, comprised about 50 percent by weight of dicumyl peroxide, about 25 percent by weight of graft copolymer, about 22.5 percent by weight of silica, about 2.5 percent by weight of DOP, and about 0.017 percent by weight of MEHQ. Preferably, more graft copolymer or a high molecular weight hydrocarbon polymer should have been added to improve processibility.

EXAMPLE 57

A predispersed α,α'-bis(t-butylperoxy)diisopropylbenzene composition was prepared using the procedure of Example 15 above. In a large beaker were mixed 72 grams of a methyl methacrylate-styrene-butadiene multi-stage graft copolymer (Acryloid KM-611), 28 grams of fumed silica (Cab-O-Sil MS-7), and 4 grams of a pre-blend of methyl ether hydroquinone (MEHQ) and red dye. The pre-blend was prepared by mixing 1920 grams of paraffinic process oil (Flexon 845, Exxon), 40 grams of MEHQ, and 20 grams of a 50/50 mixture of red 2B and EPR (B5000 Red, Disco). The graft copolymer, fumed silica, and MEHQ pre-blend were then dry blended. To this mixture was added 240 grams of molten recrystallized α,α'-bis(t-butylperoxy)diisopropylbenzene (Vul-Cup R) and the contents of the beaker were then stirred until a homogeneous mixture was obtained.

A two-roll mill was cleaned and prepared. Then, 56 grams of a blend of 1 part polyisoprene (Natsyn 2200, Goodyear) and 3 parts ethylene-propylene-diene terpolymer (EPDM) (Nordel 1070, duPont) was placed on the mill and banded. The mixture of peroxide, graft copolymer, fumed silica and MEHQ pre-blend was then added to the rubber blend on the mill and mixed until a homogeneous dispersion was obtained, and then sheeted off. The predispersed product contained about 60 percent by weight of peroxide, about 18 percent by weight of graft copolymer, about 14 percent by weight of the polyisoprene-EPDM blend, about 7 percent by weight of fumed silica, about 1 percent by weight of the process oil, about 0.02 percent by weight of MEHQ, and about 0.005 percent by weight of red dye.

EXAMPLE 58

Using the procedure of Example 15 above, a predispersed α,α'-bis(t-butylperoxy)diisopropylbenzene composition was prepared by adding 266.68 grams of molten recrystallized α,α'-bis(t-butylperoxy)diisopropylbenzene (Vul-Cup R) to a mixture of 100.0 grams of a methyl methacrylate-styrene-butadiene multi-stage graft copolymer (Acryloid KM-611), 0.08 gram of methyl ether hydroquinone (MEHQ) and 0.04 gram of blue dye (Omega Blue 153). The mixture was then stirred until it was homogeneous.

Then 33.2 grams of ethylene-propylene copolymer (Royalene 100) was placed on a clean two-roll mill and banded. The mixture of peroxide, graft copolymer, MEHQ and blue dye was then added to the ethylene-propylene copolymer on the mill, mixed until a homogeneous dispersion was obtained, and then sheeted off. The predispersed product contained about 66.7 percent by weight of peroxide, about 25.0 percent by weight of graft copolymer, about 8.3 percent by weight of ethylene-propylene copolymer, about 0.02 percent by weight of MEHQ and about 0.01 percent by weight of blue dye.

The percent by weight of each component of the predispersed compositions of Examples 55-58 is set forth in Table IX below.

TABLE IX

| Example No. | 55 | 56 | 57 | 58 |
|---|---|---|---|---|
| Di-Cup R | 60.0 | 50.0 | — | — |
| Vul-Cup R | — | — | 60.0 | 66.7 |
| MMA/EA | 35.0 | — | — | — |
| MMA/S/B | — | 25.0 | — | — |
| KM-611 | — | — | 18.0 | 25.0 |
| Cab-O-Sil MS-7 | 5.0 | — | 7.0 | — |
| Hi-Sil 233 | — | 22.5 | — | — |
| Natsyn 2200/Nordel 1070 | — | — | 14.0 | — |
| Royalene 100 | — | — | — | 8.3 |
| DOP | — | 2.5 | — | — |
| Flexon 845 | — | — | 1.0 | — |
| MEHQ | 0.02 | 0.017 | 0.02 | 0.02 |
| Red dye | — | — | 0.005 | — |
| Blue dye | — | — | — | 0.01 |

What is claimed is:

1. A non-bleeding, predispersed composition useful for dispersing a peroxide vulcanizing agent or coagent into a rubber or plastic stock comprising
   (A) from about 20 to about 70 percent by weight of a peroxide vulcanizing agent or coagent, and
   (B) a multi-stage graft copolymer comprising
      (1) from about 70 to about 90 percent by weight of a hard portion made by graft polymerizing
         (a) a monomer or monomers selected from the group consisting of lower alkyl methacrylates, styrene, and mixtures thereof, and
         (b) a small but effective amount of a cross-linking agent for said monomer or monomers, in any order onto
      (2) from about 10 to about 30 percent by weight of a rubbery portion comprising a polymer or copolymer made by polymerizing
         (a) at least one monomer selected from the group consisting of butadiene and lower alkyl acrylates or
         (b) a mixture of monomers selected from the group consisting of styrene and butadiene, and acrylonitrile and butadiene.

2. The composition of claim 1 wherein the peroxide vulcanizing agent is selected from the group consisting of dicumyl peroxide, α,α'-bis(t-butylperoxy)diisopropylbenzene, t-butyl cumyl peroxide, 2,5-dimethyl-2,5-bis(t-butylperoxy) hexyne-3, and 2,5-bis(t-butylperoxy)-2,5-dimethylhexane.

3. The composition of claim 2 wherein the peroxide vulcanizing agent is dicumyl peroxide.

4. The composition of claim 2 wherein the peroxide vulcanizing agent is α,α'-bis(t-butylperoxy)diisopropylbenzene.

5. The composition of claim 2 wherein the peroxide vulcanizing agent is t-butyl cumyl peroxide.

6. The composition of claim 2 wherein the peroxide vulcanizing agent is 2,5-dimethyl-2,5-bis(t-butylperoxy) hexyne-3.

7. The composition of claim 2 wherein the peroxide vulcanizing agent is 2,5-bis(t-butylperoxy)-2,5-dimethylhexane.

8. The composition of claim 1 wherein the peroxide vulcanizing coagent is selected from the group consisting of triallyl isocyanurate, triallyl cyanurate, triallyl trimellitate, trimethylolpropane triacrylate, and trimethylolpropane trimethacrylate.

9. The composition of claim 8 wherein the peroxide vulcanizing coagent is triallyl isocyanurate.

10. The composition of claim 8 wherein the peroxide vulcanizing coagent is triallyl cyanurate.

11. The composition of claim 8 wherein the peroxide vulcanizing coagent is triallyl trimellitate.

12. The composition of claim 8 wherein the peroxide vulcanizing coagent is trimethylolpropane triacrylate.

13. The composition of claim 8 wherein the peroxide vulcanizing coagent is trimethylolpropane trimethacrylate.

14. The composition of claim 1 further comprising a small but effective amount of a free radical polymerization inhibitor.

15. The composition of claim 14 wherein the inhibitor is methyl ether hydroquinone.

16. The composition of claim 1 further comprising up to about 12 percent by weight of a finely divided reinforcing agent or filler material.

17. The composition of claim 1 further comprising up to about 15 percent by weight of a high molecular weight hydrocarbon polymer as a processing aid.

18. The composition of claim 1 comprising from about 50 percent by weight to about 60 percent by weight of the peroxide vulcanizing agent or coagent.

19. The composition of claim 1 wherein the cross-linking agent (1)(b) is selected from the group consisting of the dimethacrylic, trimethacrylic, diacrylic and triacrylic esters of polyhydric alcohols, divinylbenzene, divinyl esters of di- or tribasic acids, diallyl esters of polyfunctional acids, and divinyl ethers of polyhydric alcohols.

20. The composition of claim 1 wherein the monomer (2)(a) or mixture of monomers (2)(b) are polymerized with a small but effective amount of a cross-linking agent for the monomer or monomers.

21. The composition of claim 20 wherein the cross-linking agent (1)(b) may be the same as or different from the cross-linking agent for monomer (2)(a) or mixture of monomers (2)(b) and wherein both of said cross-linking agents are selected from the group consisting of the dimethacrylic, trimethacrylic, diacrylic and triacrylic esters of polyhydric alcohols, divinylbenzene, divinyl esters of di- or tribasic acids, diallyl esters of polyfunctional acids, and divinyl ethers of polyhydric alcohols.

22. The composition of claim 21 wherein both hard portion (1) and rubbery portion (2) comprise from about 0.1 to about 5 percent by weight of cross-linking agent based on the weight of the monomer or monomers in each.

23. The composition of claim 2 or 8 wherein monomer (1)(a) is a lower alkyl methacrylate and monomer (2)(a) is a lower alkyl acrylate.

24. The composition of claim 23 wherein monomer (1)(a) is methyl methacrylate and monomer (2)(a) is n-butyl acrylate.

25. The composition of claim 23 further comprising a small but effective amount of a free radical polymerization inhibitor.

26. The composition of claim 25 further comprising up to about 12 percent by weight of a finely divided reinforcing agent or filler material.

27. The composition of claim 25 further comprising up to about 15 percent by weight of a high molecular weight hydrocarbon polymer as a processing aid.

28. The composition of claim 2 or 8 wherein monomers (1)(a) are methyl methacrylate and styrene and monomer (2)(a) is butadiene.

29. The composition of claim 28 further comprising a small but effective amount of a free radical polymerization inhibitor.

30. The composition of claim 29 further comprising up to about 12 percent by weight of a finely divided reinforcing agent or filler material.

31. The composition of claim 29 further comprising up to about 15 percent by weight of a high molecular weight hydrocarbon polymer as a processing aid.

32. The composition of claim 2 or 8 wherein monomers (1)(a) are methyl methacrylate and styrene and monomer mixture (2)(b) is styrene and butadiene.

33. The composition of claim 32 further comprising a small but effective amount of a free radical polymerization inhibitor.

34. The composition of claim 33 further comprising up to about 12 percent by weight of a finely divided reinforcing agent or filler material.

35. The composition of claim 33 further comprising up to about 15 percent by weight of a high molecular weight hydrocarbon polymer as a processing aid.

* * * * *